UNITED STATES PATENT OFFICE.

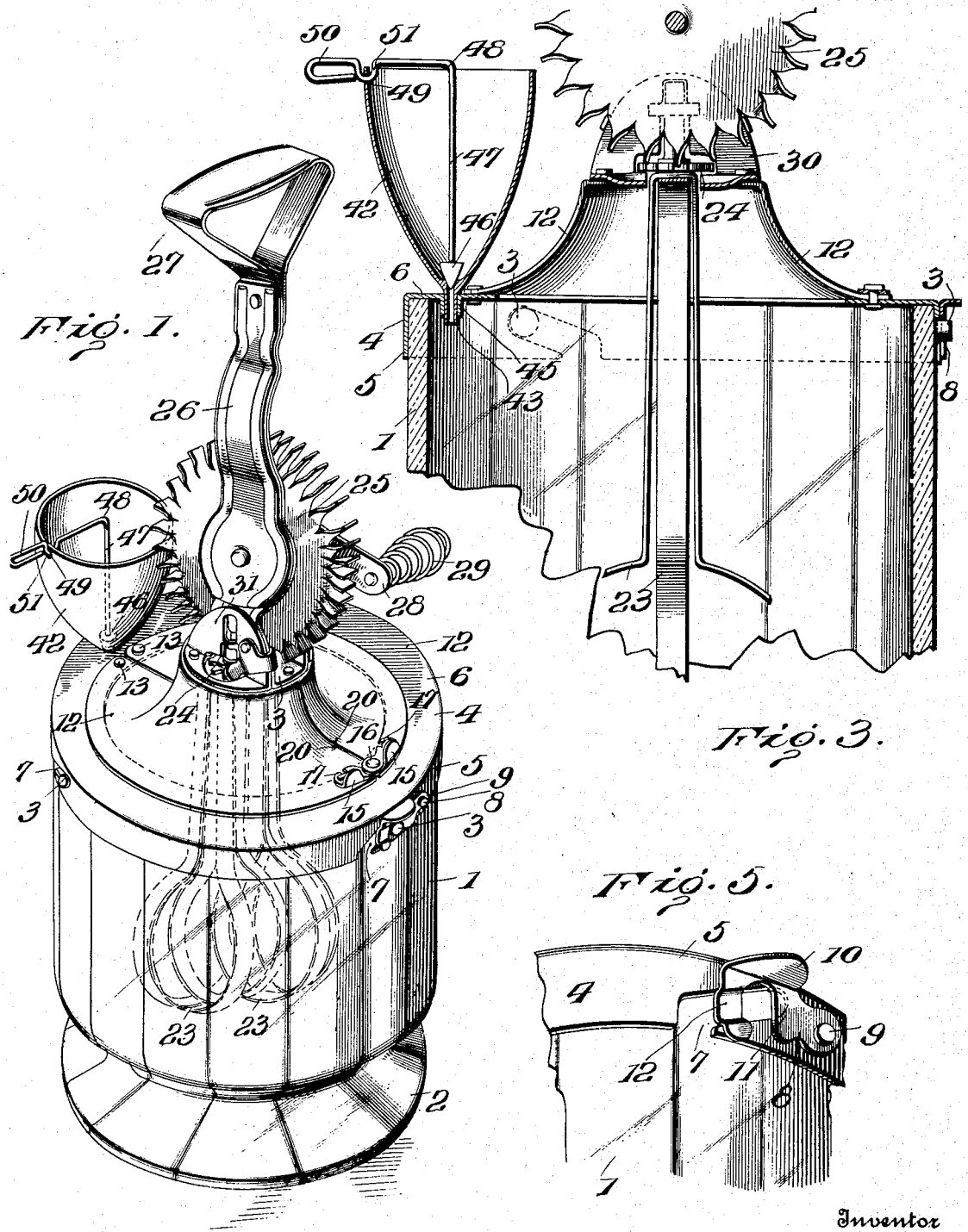

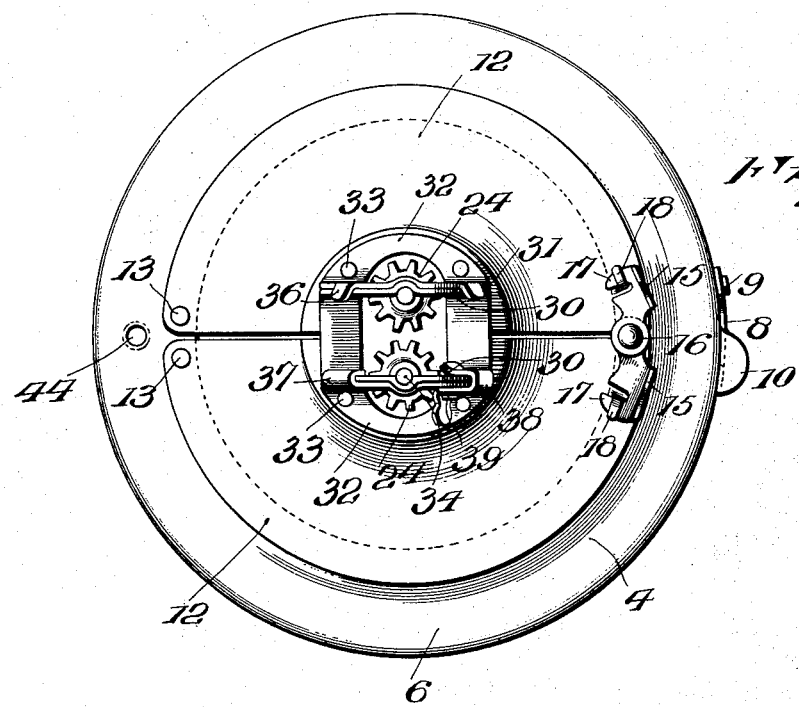
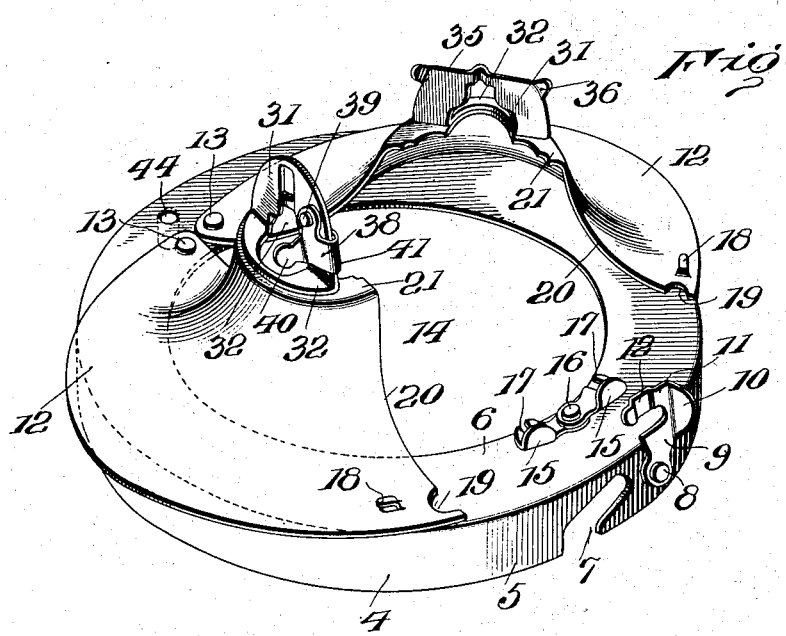

LAVERN BORDWELL, OF NEW YORK, N. Y.

MIXER.

1,171,923. Specification of Letters Patent. Patented Feb. 15, 1916.

Application filed November 28, 1914. Serial No. 874,410.

*To all whom it may concern:*

Be it known that I, LAVERN BORDWELL, a citizen of the United States, residing at New York city, in the county of New York and State of New York, have invented certain new and useful Improvements in Mixers, of which the following is a specification, reference being had therein to the accompanying drawing.

My invention relates to improvements in mixers, the primary object of which is to construct a mixer comprising a receptacle and means carried by the receptacle, whereby a beater may be used with the cover and the receptacle, or the beater may be detached therefrom and used separately.

The receptacle and the cover here shown are especially adapted to be used with a beater such as is fully described in the Ladd Patent No. 892,856, dated July 7th 1908.

Another object of the present invention is to construct a mixer which comprises a receptacle upon which is mounted a cover having two hinged portions whereby the cover may be partially opened and the beater taken out of the receptacle.

A further object of the present improvement is to provide a connection between the beater, cover and receptacle which will readily allow the cover and beater to be removed from the receptacle so that the receptacle may be used alone or for other purposes.

A still further object of the present improvement is to construct a mixer provided with an oil feeding device whereby the amount of oil fed into the mixer may be easily regulated by the user.

Other objects and advantages of the present improvement will be more fully set forth in the following description and drawings, in which—

Figure 1 is a perspective view of my improved mixer, showing the receptacle with its cover carrying the beater and the oil-feeding device. Fig. 2 is a top plan view of the cover and beater, showing the handle and actuating means for the beater-blades broken away. Fig. 3 is a side elevation partly in section, showing the specific construction of the oil-feeding device and its application to the cover. Fig. 4 is a perspective view of the cover showing the two hinged portions swung apart and the connecting means for the beater with the cover in detail. Fig. 5 is a fragmental enlarged perspective view of the means for fastening the cover to the receptacle.

Referring now to the drawings, in which like reference numerals designate similar parts, 1 represents a receptacle which is here shown as being constructed of glass and having an outwardly flared base 2, but it is readily apparent that the particular shape of the receptacle or the material of which it is composed may be altered or changed without departing from the spirit and scope of the present improvement. The upper edge of the receptacle is provided with three lugs 3, which are arranged upon the outer periphery of the receptacle so arranged as to divide the periphery into thirds.

A cover 4 is provided which comprises a vertical flange or wall 5, which fits over the upper edge of the receptacle edge 1, and a horizontal flange or wall 6. The vertical wall 5 is provided with three bayonet-slot openings 7, which are adapted to be fitted over the lugs 3 and be turned until the lugs engage the uppermost portion of the slot, as is readily understood. Adjacent one of the slots 7 is provided a catch 8 pivoted to the cover by means of a pivot 9. This catch comprises a finger-engaging portion 10 and a depending lip 11, provided with an inwardly bent portion 12, of a width equal to the width of the bayonet slot 7, so that the portion 12 will close the opening 7 and will be held therein. This catch 8 being constructed as above, provides means whereby the catch may be swung into and out of locked position in a simple manner and also provides an uncomplicated way of locking the one lug over which the catch is swung and thereby locking the other lugs in the other two slots, as will be readily understood. The cover 4 is provided with two inwardly and upwardly extending portions 12, which are pivoted to the cover at the points 13. When these portions 12 are swung together they close a circular opening 14, which is cut in the horizontal wall 6 of the cover 4. The portions 12 are held in their closed positions by means of two catches 15, pivoted at the point 16 on the cover 4. These catches are provided with forked portions 17 which slide under lugs 18 struck out on the upper surface of the portions 12. Adjacent the lugs 18 the cover is cut away at the point 19 so as to allow the edges 20 of the portions 12 to abut each other.

The upwardly curved portions of the hinged members 12 terminate in two reduced substantially semi-circular flattened portions 21. The beater here used in conjunction with this cover is of the form known as the "Ladd beater" which comprises beater blades 23, which are operated by gears 24, which mesh with the manually turned driving gear 25 carried by an upright 26 of a handle 27. The operating means of the gear 25 comprises a crank 28 to which is attached a knob 29. The specific form of beater will not be referred to further herein as it has been fully described in the Ladd patent, the only parts which will be especially referred to in this application are the parallel flanges 30, which carry the parallel arranged gears 24. Two flanges 31 of relatively the same size and shape as the flanges 30 of the beater are attached to the semi-circular flattened portions 21 of the cover. These flanges 31 are attached to the portions 21 by means of laterally bent portions 32, and bolts 33, which pass therethrough clamping them to the portions 21. These two flanges are arranged so as to be in parallel position adjacent to the flanges 30 of the beater, when the portions 12 are swung in their closed position. Both flanges 31 are cut away at the points 32 to allow for the stub shafts 34 on which rotate the parallel gears 24 of the beater. One of the said flanges 31 is cut away at the portion 35 so as not to interfere with the crank 28 of the beater which is adjacent thereto. This flange is provided with two inwardly bent lugs 36. The other flange is provided with a lug 37, which is bent inwardly a distance sufficient to cause one portion of the lug to be parallel with the flange. The opposite edge of the flange is provided with a catch 38, which is pivotally mounted at 39. This catch consists of a handle 40 and a U-shaped lip 41, the legs of which are spaced apart a distance equal to the thickness of the flange and the adjacent flange 30 of the beater so that when the catch is swung in its downward position, it will embrace and clamp the flange 30 of the beater and the flange 31 carried by the cover together.

The oil feeding mechanism comprises a funnel 42, provided with a spout 43. This spout 43 passes through an opening 44 in the horizontal portion 6 of the cover. This opening 44 is positioned directly opposite the pivotal points 13 of the hinged portions 12 of the cover. A short tubular portion 45 is provided below the opening 44 to provide a firm seat for the spout 43 and prevent the funnel from wabbling. A valve is mounted within the funnel comprising a conical-shaped member 46, which is adapted to fit in the opening in the bottom of the funnel and close it. This conical portion 46 is carried by a rod 47, which is bent at right-angles at the point 48 and passes through an opening 49 in the edge of the funnel. A handle 50 is formed on the end of the rod 47. The rod 47 is bent downwardly at the point 51 where the said rod passes through the opening 49 in the funnel so that when the conical member 46 is seated, the downwardly bent portion 51 will be sprung upwardly and engage the upper edge 49 and hold the member 46 in a seated position. When it is desired to unseat the member 46, it is only necessary to press downwardly on the handle 50, whereby the downwardly bent portion 51 will be disengaged from the opening 49 and allow the conical member 46 to slip out of its seated position.

From the foregoing description and by reference to the Ladd patent, it will be seen that the attaching means here provided necessitates absolutely no change in the construction of the beater. However, it is to be understood that the specific form here shown is but one means of accomplishing the detachable connection between the cover and the beater.

From the foregoing description it will be seen that a mixer is provided in which the beater is removably carried by the cover so that the beater may be detached from the receptacle and cover without removing the cover. It is also readily apparent that a mixer has been provided in which the cover may be removed from the receptacle and the beater removed from the cover so that the receptacle may be used alone and the beater used separately from the cover.

Having thus described my invention, what I claim and desire to secure by Letters Patent is:

1. In a mixer, the combination with a receptacle having an open top, of a cover therefor comprising a ring-like member attachable to the top of the receptacle, two swinging members carried by the ring-like member, and an attachable beater mechanism, a flange carried by one of the swinging members adapted to interlock with the beater mechanism.

2. In a mixer, the combination with a receptacle having an open top, of a cover therefor comprising a ring-like member attachable to the top of the receptacle, two swinging members carried by the ring-like member, and an attachable beater mechanism, a flange on the swinging member, the two said flanges arranged to lie adjacent each other, and a catch carried by one of the said flanges for clamping them together.

3. In a mixer, the combination with a receptacle having an open top, of a cover therefor comprising a body portion attachable to the top of the receptacle, the said body portion having an opening therein, two swinging members carried by the body portion to span the opening therein, and an attachable beater mechanism, the swinging members adapted to interlock with the beater mechanism.

4. In a mixer, the combination with a receptacle having an open top, of a cover therefor comprising a body portion attachable to the top of the receptacle, the said body portion having an opening therein, swinging members carried by the body portion, and an attachable beater mechanism, the swinging members adapted to interlock with the beater mechanism.

5. In a mixer, the combination with a receptacle having an open top, of a cover therefor comprising a body portion attachable to the top of the receptacle, the said body portion having an opening therein, swinging members carried by the body portion, and an attachable beater mechanism, the said swinging members when in their closed position forming an interlocking connection with the beater mechanism and in their open position allowing the withdrawal of the beater from the receptacle, and an attachment from its interlocking connection with the swinging members.

6. A mixer comprising a receptacle, a beater, said beater comprising a framework, beater blades carried thereby, actuating means for the said blades and a handle, the said framework having two parallel oppositely arranged flanges intermediate the beater blades and the handle, a cover carried by the receptacle, said cover comprising a body portion attachable to the top of the receptacle, said body portion having an opening therein, two swinging members carried by the body portion, a flange carried by each of the said swinging members, said flanges abutting and adjacent to the blades of the beater framework when the two swinging members are in their closed position, friction means carried by the blades of the swinging members for engaging and holding the flanges of the beater.

7. A mixer comprising a receptacle, a beater, a support for the beater carried by the receptacle, said support comprising a body-portion, said body-portion comprising a vertical wall and a horizontal wall, the vertical wall of the support provided with slots, lugs on the upper edge of the receptacle, the said slots adapted to slide over the said lugs and the vertical wall of the support adapted to lie adjacent the upper edge of the receptacle, a catch carried by the said vertical wall of the support and adjacent one of the said slots, said catch comprising a member pivoted to the vertical wall and having a forked end adapted to fit over the lug of the receptacle, one of the prongs of the said forked member having an inwardly bent portion adapted to engage the wall of the slot to form a lock for the catch, two pivoted sections carried by the horizontal portion of the support adapted to form an interlocking connection with the beater when in their closed position.

8. In a mixer, the combination with a receptacle having an open top, of a cover therefor comprising a body portion attachable to the top of the receptacle, the said body portion having an opening therein, swinging members carried by the body portion, an attachable beater mechanism, the swinging members adapted to interlock with the beater mechanism, and a catch for holding the swinging members in their closed position.

9. A mixer, comprising a receptacle, a beater, a support for the beater carried by the receptacle, said support comprising a body portion attachable to the top of the receptacle, said body portion having an opening therein, and hinged sections carried by the body portion and adapted to form an interlocking connection with the beater when in their closed position, lugs carried by the upper edge of the receptacle, and means carried by the body portion of the support for engaging and locking the said body portion to the said lugs, the hinged sections when open allowing the beater to be withdrawn from the receptacle and from detachment with its interlocking connection with the swinging members.

10. In a mixer the combination with a receptacle having an open-top, of a cover therefor comprising a ring-like member attachable to the top of the receptacle, two swinging members carried by the ring-like member, and an attachable beater mechanism, the swinging members adapted to interlock with the beater mechanism.

11. In a mixer the combination with a receptacle having an open top, of a cover therefor, comprising a ring-like member attachable to the top of the receptacle, swinging members carried by the ring-like member to span the opening therein, and a beater mechanism detachably supported by the swinging members.

12. In a mixer, the combination with a receptacle having an open top, of a cover therefor comprising a ring-like member attachable to the top of the receptacle, two swinging members carried by the ring-like member to span the opening therein, the two swinging members adapted when in their closed position to form an interlocking connection with the beater and when in their open position to allow the withdrawal of the beater from the receptacle and a detachment from its interlocking connection with the swinging members.

13. In a mixer, the combination with a receptacle having an open top, of a cover therefor comprising a body portion attachable to the top of the receptacle, swinging members carried by the body portion, said members comprising flat portions and upwardly flared portions, and an attachable beater mechanism, the upwardly flared portions of the swinging members adapted to interlock with the beater mechanism.

14. In a mixer, the combination with a receptacle having an open top, of a cover therefor comprising a ring-like member attachable to the top of the receptacle, swinging members carried by the ring-like member, said swinging members comprising flat portions and upwardly flared portions, and an attachable beater mechanism, flanges carried by the upwardly flared portions of the swinging members adapted to interlock with the beater mechanism.

15. In a mixer, the combination with a receptacle having an open top, of a cover therefor comprising a ring-like member attachable to the top of the receptacle, two swinging members carried by the ring-like member, the said swinging members comprising a flat portion and an upwardly flared portion, and an attachable beater mechanism, the upwardly flared portions of the swinging members adapted to interlock with the beater mechanism, and a catch engaging the flat portions of the swinging members for holding them together.

16. A mixer comprising a receptacle, a beater, a cover for the receptacle, said cover comprising a ring-like member attachable to the top of the receptacle, two swinging members carried by the ring-like member, an attachable beater mechanism, swinging members adapted to interlock with the beater mechanism, and an oil feeding mechanism removably carried by the ring-like section of the cover.

17. A mixer comprising a receptacle, a beater, a cover for the receptacle, said cover comprising a ring-like member attachable to the top of the receptacle, two swinging members carried by the ring-like member, an attachable beater mechanism, swinging members adapted to interlock with the beater mechanism, and an oil feeding mechanism removably carried by the ring-like section of the cover, said mechanism comprising a funnel shaped body portion, a valve within the body portion adapted to close the opening in its bottom, an annular shaped rod carried by the said valve and having its horizontal portion passing through the body portion and its extending end provided with a handle, the said horizontal portion provided with a bend adapted to form a lock with the body portion.

18. In a mixer, the combination with a receptacle having an open top, of a cover therefor comprising a body portion attachable to the top of the receptacle, said body portion having an opening therein, two swinging members carried by the body portion, and an attachable beater mechanism, the said swinging members forming a support for the beater mechanism.

In testimony whereof I hereunto affix my signature in the presence of two witnesses.

LAVERN BORDWELL.

Witnesses:
J. W. TILL,
O. F. BISHOP.